United States Patent [19]
Malvestuto, Jr.

[11] 3,965,836
[45] June 29, 1976

[54] HIGH SPEED WATER VESSEL

[76] Inventor: Frank S. Malvestuto, Jr., 4295 East Mexico Ave., Denver, Colo. 80222

[22] Filed: Jan. 30, 1975

[21] Appl. No.: 545,493

Related U.S. Application Data

[63] Continuation of Ser. No. 244,147, April 14, 1972, abandoned.

[52] U.S. Cl............................ 114/66.5 R; 244/106
[51] Int. Cl.² ........................................ B63B 1/18
[58] Field of Search ................. 114/66.5 R, 66.5 H, 114/66.5 S, 61, 56, 67; 244/6, 7 R, 101, 105, 106, 12 R

[56] References Cited
UNITED STATES PATENTS

| | | | |
|---|---|---|---|
| 1,414,186 | 4/1922 | Holson | 244/6 |
| 2,349,584 | 5/1944 | Arnstein et al. | 244/106 |
| 2,752,113 | 6/1956 | Green | 244/105 |
| 3,089,666 | 5/1963 | Quenzler | 244/7 R |
| 3,372,891 | 3/1968 | Malvestuto, Jr. | 244/12 R |

*Primary Examiner*—Trygve M. Blix
*Assistant Examiner*—Sherman D. Basinger

[57] ABSTRACT

A high speed water vessel includes a body having a waterborne hull which is lifted upwardly as the vessel moves through the water to reduce drag forces on the hull. Lift forces are imparted to the hull under the combined influence of rotors and airfoils or wings. The rotors include blades which are located within semicircular-shaped recesses in the trailing edges of the airfoils. Upon rotation of the blades, air pressure thrust forces are applied against the trailing edges of the airfoils to propel the vessel forwardly through the water. In addition, rotation of the blades induces air to flow across the upper surfaces of the airfoils and downwardly at the trailing edges of the airfoils to promote the application of air pressure lift forces to the airfoils. These lift forces raise the hull of the vessel so that the vessel can move through the water at high speeds.

6 Claims, 3 Drawing Figures

HIGH SPEED WATER VESSEL

This is a continuation of application Ser. No. 244,147, filed Apr. 14, 1972 and now abandoned.

The present invention relates to a water vessel and particularly relates to a water vessel which is provided with a lift device which raises the hull of the vessel partially out of the water to enable the vessel to move through the water at relatively high speeds.

The present invention is directed to a high speed water vessel which is provided with an augmented lift system in order to reduce the draft of the vessel and the energy required to move the vessel through the body of water. The vessel embodying the present invention is provided with airfoils or wings which project from the hull of the vessel. As the airfoils move through the atmosphere, they provide a lift force which raises the hull to reduce the draft of the vessel and hydraulic drag forces on the hull. In accordance with the present invention, rotors are associated with the airfoils to increase the velocity of the air flow over the upper surface of the airfoils and decrease the velocity of the air flow beneath the airfoils. Of course, this increases the effectiveness of the airfoils. In addition, the rotors provide an upward thrust which adds to the lift provided by the airfoils.

On the outer ends of the airfoils are pontoons which engage the upper surface of the body of water through which the vessel moves. The pontoons are connected with the airfoils by support structures and provide shields to minimize movement of air around the tips of the airfoils to further increase their effectiveness. In addition, the pontoons provide a buoyancy effect which further assists in carrying the weight of the vessel. Moreover, the pontoons stabilize the vessel as it moves through the water.

When the hull of the vessel has been raised under the combined influence of the rotors and airfoils, the vessel is propelled through the water at high speeds due to the action of air pressure thrust forces applied by the rotors on the trailing edges of the airfoils. Radially directed air pressure force components generated by the rotors are applied along the trailing edge surfaces of the airfoils. This forward thrust force can propel the vessel through the water at high speeds since the hydraulic drag forces on the hull of the vessel have been greatly reduced by lifting the hull to decrease the extent to which it is submersed in the water.

In order to increase the forward thrust, the rotors may be inclined or canted relative to the direction of movement of the vessel. Moreover, duplicate airfoils or tandem airfoil structures can be provided on the vessel to provide additional lift to the hull. These tandem airfoils are advantageously interconnected by pontoon structures which extend below ends of the airfoil structures.

Accordingly, it is an object of this invention to provide a new and improved water vessel which is equipped with airfoils and rotors which cooperate to lift the hull of the vessel to reduce its draft and thereby facilitate moving the vessel through the water at high speeds.

Another object of this invention is to provide a new and improved water vessel having lift devices for imparting lift force to a hull of the vessel to raise the hull relative to a body of water so that a relatively small portion of the hull is submersed in the body of water and wherein the lift devices include airfoils which produce lift forces upon movement through the air and rotatable blades which apply forwardly directed air pressure thrust forces to trailing edges of the airfoils and induce a downward flow of air at the trailing edges of the airfoils to promote the application of air pressure lift forces to the airfoils.

Further objects and features of the present invention will be apparent to those skilled in the art to which it relates from the following description of preferred embodiments thereof taken in connection with drawings in which.

Figure 1:
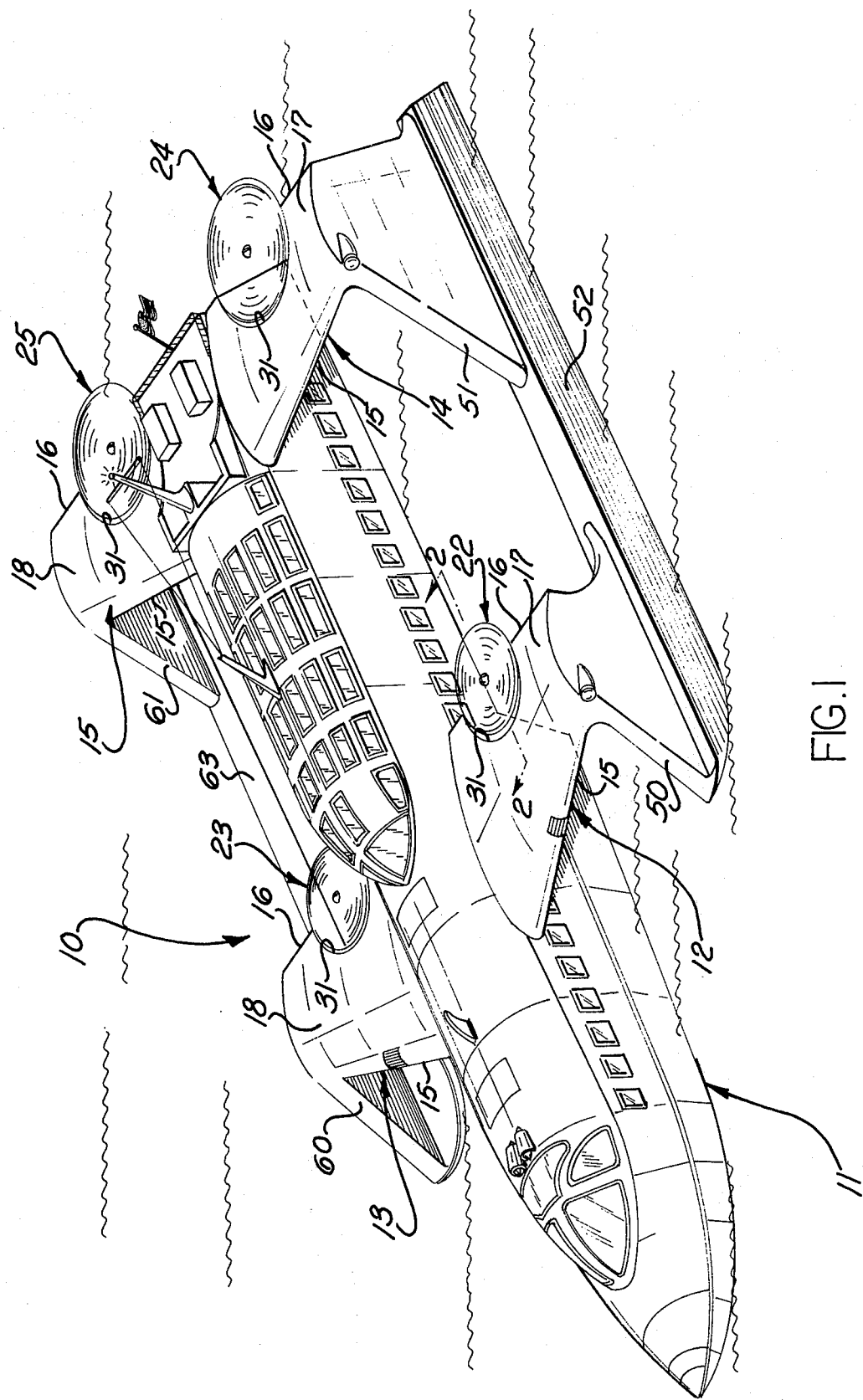
FIG. 1 is a perspective pictorial representation of a water vessel embodying the present invention.

A water vessel or ship embodying the present invention may be of many different constructions. One specific preferred embodiment of a water vessel 10 constructed in accordance with the present invention is illustrated in FIG. 1. The water vessel 10 includes a body having a hull 11 which is at least partially submersed in the water and which may carry passengers, freight, cargo, or the like.

Movement of the water vessel 10 through a body of water is retarded in a known manner by hydraulic drag forces on the hull 11. To reduce the hydraulic drag forces applied to the hull 11, the hull is lifted to reduce the extent to which the hull is submersed in the water. This enables the vessel 10 to be propelled across a body of water at high speeds with relatively low horsepower engines.

Lift forces are transmitted to the hull 11 by airfoils or wings 12, 13, 14 and 15 which project from opposite sides of the hull. The airfoils 12 and 13 are arranged symmetrically with respect to the hull 11 and project horizontally from opposite sides of the hull. Likewise, the airfoils 14 and 15 are arranged symmetrically with respect to the hull 11 and also project in opposite directions from opposite sides of the hull.

The airfoils 12, 13, 14 and 15 are all of similar construction and each include a leading edge portion 16a and a trailing edge portion 16b. Each of the airfoils has an upper surface 17 and a lower surface 18 over which streams of air flow as the airfoils move in a forward direction. The surfaces 17 and 18 are shaped in a known manner so as to cause a differential in the velocity of the air flow across surfaces. The air flow across the upper surface 17 is at a higher velocity than the air flow across the lower surface 18. The differential in the velocity of the air flow results in a pressure differential across the airfoils. This pressure differential provides an upward lift on the airfoils 12, 13, 14 and 15 to reduce the draft of the water vessel 10.

The lift forces applied to the hull 11 are increased by rotor devices, designated 22, 23, 24 and 25, respectively. Each of the rotor devices is mounted at the trailing edge of its associated airfoil in the same manner as all the others and accordingly only the association of the rotor device 22 with the airfoil 12 will be described in detail. Although the rotor devices are disclosed as being mounted on the airfoils, it should be noted that they could be mounted on the hull 11 as long as they are disposed adjacent to the trailing edges of the airfoils.

Figure 2:
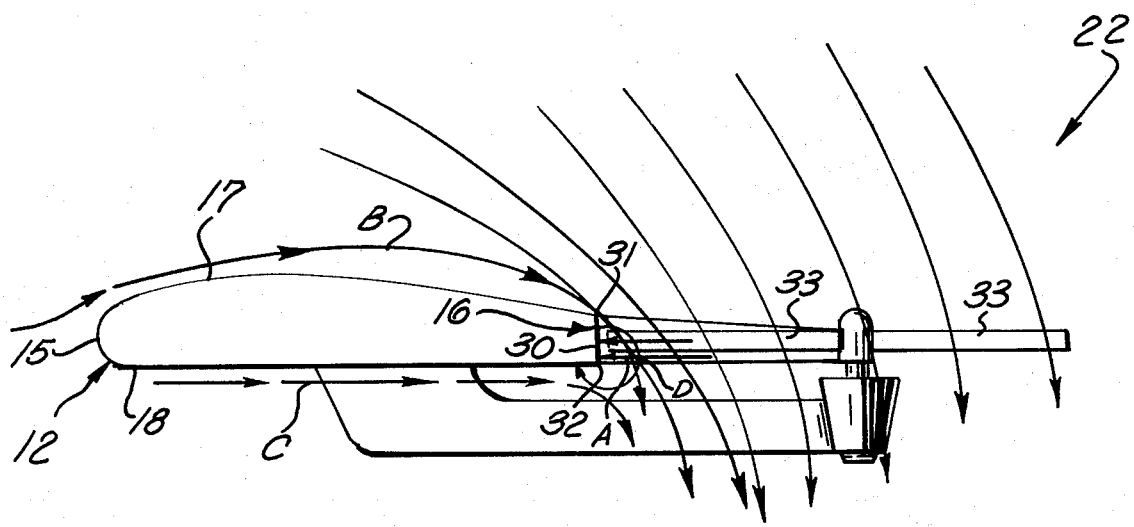
FIG. 2 is a somewhat schematic view taken approximately along the section line 2—2 of FIG. 1.

The airfoil 12, like all of the other airfoils, has a semicircular recess formed in the trailing edge 16b thereof and which recess is defined by a trailing edge semicircular surface portion, designated 30 (FIG. 2). The trailing edge surface 30 has an upper edge 31 at which it intersects with the upper surface 17 of the airfoil, and has a lower edge 32 at which it intersects with the lower surface 18 of the airfoil. The rotor device 22 includes a plurality of rotating blades 33. The blades 33 are supported in a suitable manner from the wing 12 for rotation about an axis which corresponds with the axis of the semicircular surface 30. The blades 33 project radially into close proximity with the surface 30 but are spaced somewhat therefrom. The tips of the blades rotate in a plane which intersects the surface 30 intermediate the edges 31 and 32 thereof. Preferably, the blades are located above the centerline of the surface 30, for purposes to be described hereinbelow.

Rotation of the blades 33 causes an increase in the speed of movement or velocity of the air across the upper surface 17 of the airfoil 12 and causes a reduction of the velocity of air flow under the surface 18 of the airfoil. The interaction between the blades and airfoil is the same as is disclosed in U.S. Pat. No. 3,372,891 which is incorporated herein in its entirely by this reference thereto. As a result of the increase in the flow of air across the upper surface 17 (as shown by arrows B in FIG. 2) and a decrease in the flow of air beneath the surface 18 (as shown by arrows C in FIG. 2) the lift effect of the airfoil 12 is augmented or increased by the action of the rotary device 22.

The rotary device 22 forces a stream of air downwardly past the trailing edge of the airfoil and against the body of water through which the vessel 10 is moving. The water deflects this downwardly directed stream of air sidewardly under the airfoil 12 to increase the pressure on the underside of the airfoil and the lift effect provided by the airfoil. The rotary device 22 also provides a vertical thrust component which tends to raise or lift the vessel 10 in much the same manner as in which a helicopter is lifted by its rotor. This thrust component is enhanced by the reaction of the downwardly directed stream of air against the water. Moreover, a vortex action is provided at the trailing edge of each blade which further add to the vertical lift and which action is designation D in FIG. 2.

As noted above, the plane of rotation of the rotor blades 33 above the center of the surface 30 and as a result the air beneath the plane of rotation of the blades is at a high pressure. This high pressure air applies forward thrust component to the airfoil 12 as shown by arrows A in FIG. 2. The combined forward thrust provided by the rotors 22–25 is sufficient, when coupled with the lift action of the rotors and airfoils 12–14, to propel the vessel 10 at high speeds through a body of water.

Figure 3:
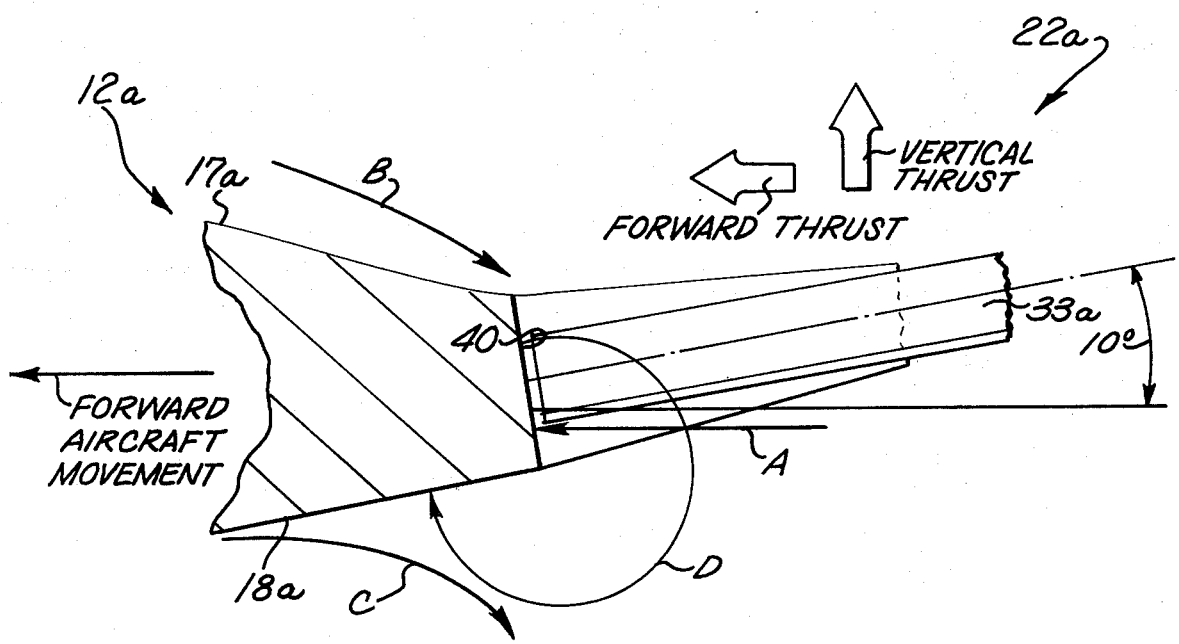
FIG. 3 is a somewhat schematic view similar to that of FIG. 2 and illustrating a modification of the present invention.

In order to increase the forward thrust applied by the rotor 22 to the airfoil 12, it is possible to cant the rotor as shown in the embodiment of FIG. 3. In the embodiment of FIG. 3, the rotor device 22a is canted relative to the direction of movement of the vessel and when so canted, the surface 40 which defines a semicircular surface in the trailing portion of the wing is also canted to the direction of movement of the vessel. As a result, the plane of rotation of the blades 33a intersect the surface 40 and the axis of rotation of the blades corresponds with the axis of the semicircular surface. Moreover, the canted blades 33a provide increased forward thrust due to the angle at which their plane is disposed. In addition the blades 33a cooperate with the surface 40 in precisely the same manner as described in connection with FIG. 2 to provide additional forward thrust forces.

In addition to the augmented lift action created by the rotors which causes an increase in the velocity of air flowing over the upper surfaces of the airfoils and a decrease in the velocity of flow of air beneath the airfoil, the tips of the blades as they rotate within the circular surface create a vortex action. The vortex action creates a circular flow of air which causes an additional lift to be applied to the undersurface of the airfoil as represented by D in FIG. 3.

As noted hereinabove, each of the airfoils is provided with a rotor device and in the embodiment shown there are four airfoils 12–14 and four rotor devices 22–25, all of which cooperate to apply a lift to the water vessel 10 and at the same time tend to propel the water vessel through the body of water. It should be apparent that the airfoils 14 and 15 are located above the airfoils 12 and 13. This vertical orientation of the airfoils 14 and 15 tends to minimize the air disturbances on the airfoils 14 and 15 which may be created by the airfoils 12 and 13 immediately preceding through the atmosphere in advance of the airfoils 14 and 15. In addition, the spacing of the airfoils 12 and 13 with respect to the airfoils 14 and 15 is such that a tandem or further augmented effect is provided. Preferably, the airfoils 14 and 15 are spaced from the airfoils 12 and 13 a distance such that the rotor devices 22 and 23 associated with the airfoils 12 and 13 cause a downward flow of air toward the rotor devices 24 and 25. As a result, the rotor devices 24 and 25 are more effective than they would be in the absence of the rotor devices 22 and 23. In effect, the lift action on the airfoils 14 and 15 is a result of the lift created by the flow of air caused by the rotor devices 24 and 25 themselves and the lift action created by the flow of air caused by the rotor devices 22 and 23.

Attached to the outer tips of the air foils 12 and 14 are vertically extending support panels 50 and 51, respectively. The panels 50 and 51 support a pontoon 52 which extends beneath the airfoils 12 and 14 and which is adapted to engage the surface of the water. The panels 50 and 51 are imperforate and tend to minimize the flow of air around the tip of the airfoils. Therefore the panels 50 and 51 provide the well-known "endplate" effect in order to increase the efficiency of the airfoils 12 and 14. Vertically extending panels 60 and 61 are connected with the airfoils 13 and 15 and support at their lower ends a pontoon 63 which is adapted to engage the upper surface of the water. The pontoons 52 and 63 provide a stabilizing effect on the vessel.

When the water vessel 10 is floating in a body of water and the rotor devices 22–24 are inactive, the hull 11 is submersed to a relatively deep depth in the water. If the vessel 10 were to be driven through the water while the hull 11 is deeply submersed, hydraulic drag forces on the hull would require the expenditure of relatively large amounts of energy to propel the vessel at even moderately high speeds. However, the airfoils 12–15 and rotors 22–25 lift the hull 11 so that only a relatively small portion of the hull is submersed. By reducing the extent to which the hull 11 is submersed, the hydraulic drag forces which are applied to the hull when the vessel 10 is moving through the water are greatly reduced. This enables the vessel 10 to be propelled at high speeds with the expenditure of relatively small amounts of energy.

From the foregoing description it is apparent that the vessel 10 is lifted under the influence of the airfoils 12–15 and rotor devices 22–25 to enable the vessel to be propelled through the water at high speeds. The high speed water vessel 10 includes a body having a waterborne hull 11 which is lifted upwardly as the vessel moves through the water to reduce drag forces on the hull. Lift forces are imparted to the hull 11 under the combined influence by the flow of air across airfoils or wings. The rotor devices 22–25 include blades which are located within semicircular-shaped recesses in the trailing edges of the airfoils 12–15. Upon rotation of the blades, air pressure thrust forces are applied against the trailing edges of the airfoils to propel the vessel 10 forwardly through the water. In addition, rotation of the blades induces air to flow across the upper surfaces 17 of the airfoils and downwardly at the trailing edges of the airfoils to promote the application of air pressure lift forces to the airfoils. These lift forces raise the hull 11 of the vessel 10 so that the vessel can move through the water at high speeds.

Having described specific preferred embodiments of the invention, the following is claimed:

1. A boat comprising a hull having a surface for engaging a body of water to derive lift from the body of water during movement of said hull through the body of water, means for imparting additional lift forces to said hull to reduce water drag forces on said hull by raising said hull relative to the body of water from a first position in which a relatively large portion of said hull is submersed in the body of water to a second position in which a relatively small portion of said hull is submersed in the body of water, including an airfoil portion extending transversely relative to said hull at a location above said surface for producing a lift force upon movement through the air and propulsion means, said airfoil portion including an upper surface, a lower surface, and a trailing surface extending transversely to said upper and lower surfaces, said trailing surface being configured to define an arcuate recess having a forward portion and a pair of rearwardly extending side portions, said propulsion means including blade means disposed adjacent to a trailing surface of said airfoil portion for applying forward directed air pressure thrust forces to said trailing surface of said airfoil portion and for inducing a flow of air along a path extending across an upper surface of said airfoil portion and downwardly toward the body of water at the trailing surface of said airfoil portion to induce the application of air pressure lift forces to said airfoil portion and movement of said hull from the first position toward the second position, said blade means including a plurality of generally radial blades having tip portions which are movable along an annular path which is at least partially disposed within said arcuate recess, said annular path having a forward portion which is disposed closely adjacent to said forward portion of said recess and is disposed above said lower surface and below said upper surface, said annular path having a pair of spaced apart side portions which are disposed closely adjacent to said rearwardly extending side portions of said recess, each of said side portions of said annular path being disposed above said lower surface of said airfoil portion and below said upper surface of said airfoil portion, each of said blades including surface means for inducing the application of forwardly directed air pressure thrust forces against said trailing surface at said forward portion of said recess, the blade means being rotatable in a plane which is canted at an angle relative to the direction of movement of said vessel and which intersects the trailing surface of the airfoil portion, the blade means also being rotatable about an axis which is canted at angle relative to the forward direction of movement of said vessel.

2. A water vessel comprising a hull having a surface for engaging a body of water during movement of said hull through the body of water, means for imparting lift forces to said hull to raise said hull relative to the body of water from a first position in which a relatively large portion of said hull is submersed in the body of water to a second position in which a relatively small portion of said hull is submersed in the body of water, including first airfoil means extending transversely from a first side of said hull at a first location above said surface for producing a lift force upon movement through the air, first propulsion means for imparting forward thrust forces to said first airfoil means, said first propulsion means including first blade means disposed adjacent to a trailing edge portion of said first airfoil means for applying forwardly directed air pressure thrust forces to the trailing edge portion of said first airfoil means and for inducing a flow of air downwardly toward the body of water, said first blade means including means for inducing a flow of air along a path extending across an upper surface of said first airfoil means and downwardly at the trailing edge portion of said first airfoil means toward the body of water to decrease the air pressure applied against an upper surface of said first airfoil means to thereby induce the application of air pressure lift forces to said first airfoil means and movement of said hull from the first position toward the second position, second airfoil means extending transversely from said first side of said hull at a second location spaced from said first location and disposed above said surface for producing a lift force upon movement through the air, and second propulsion means for imparting forward thrust forces to said second airfoil means, said second propulsion means including second blade means disposed adjacent to a trailing edge portion of said second airfoil means for applying forwardly directed air pressure thrust forces to the trailing edge portion of said second airfoil means and for inducing a flow of air downwardly toward the body of water, said second blade means including means for inducing a flow of air along a path extending across an upper surface of said second airfoil means and downwardly at the trailing edge portion of said second airfoil means toward the body of water to decrease the air pressure applied against an upper surface of said second airfoil means to thereby induce the application of air pressure lift forces to said second airfoil means and movement of said hull from the first position toward the second position.

3. A water vessel as set forth in claim 2 wherein said trailing edge portions of said first and second airfoil means each include a trailing surface configured to define an arcuate recess, said first blade means having a tip portion which is movable along an annular path which is at least partially disposed in the arcuate recess in first airfoil means, said second blade means having a tip portion which is movable along an annular path which is at least partially disposed in the arcuate recess in said second airfoil means.

4. A water vessel as set forth in claim 3, further including pontoon means having a portion extending from a location beneath an outer end portion of said first airfoil means to a location beneath an outer end portion of said second airfoil means, and means for connecting said pontoon means with said first and second airfoil means.

5. A water vessel comprising a hull having a surface for engaging a body of water during movement of said hull through the body of water, means for imparting lift forces to said hull to raise said hull relative to the body of water from a first position in which a relatively large portion of said hull is submersed in the body of water to a second position in which a relatively small portion of said hull is submersed in the body of water, including airfoil means extending transversely from said hull at a location above said surface for producing a lift force upon movement through the air and propulsion means for imparting forward thrust forces to said airfoil means, said propulsion means including blade means disposed adjacent to a trailing edge portion of said airfoil means for applying forwardly directed air pressure thrust forces to the trailing edge portion of said airfoil means and for inducing a flow of air along a path extending across an upper surface of said airfoil means and downwardly at the trailing edge portion of said airfoil means to induce the application of air pressure lift forces to said airfoil means and movement of said hull from the first position toward the second position, said airfoil means including a first wing portion extending outwardly from one side of said hull and a second wing portion extending outwardly from another side of said hull, said blade means including a first blade member mounted for rotation adjacent to a trailing edge portion of said first wing portion and a second blade member mounted for rotation adjacent to the trailing edge portion of said second wing portion, said airfoil means further including a third wing portion extending outwardly from said one side of said hull at a location spaced rearwardly from said first wing portion and a fourth wing portion extending outwardly from said other side of said hull at a location spaced rearwardly from said second wing portion, said blade means further including a third blade member mounted for rotation adjacent to a trailing edge portion of said third wing portion and a fourth blade member mounted for rotation adjacent to a trailing edge portion of said fourth wing, first pontoon means disposed on said one side of said hull and having a portion extending from a location beneath an outer end portion of said first wing portion to a location beneath an outer end portion of said third wing portion, first means for connecting said first pontoon means with said first and third wing portions, second pontoon means disposed on said other side of said hull and having a portion extending from a location beneath an outer end portion of said second wing portion to a location beneath an outer end portion of said fourth wing portion, and second means for connecting said second pontoon means with said second and fourth wing portions.

6. A boat comprising a hull having a surface for engaging a body of water to derive lift from the body of water during movement of said hull through the body of water, means for imparting additional lift forces to said hull to reduce water drag forces on said hull by raising said hull relative to the body of water from a first position in which a relatively large portion of said hull is submersed in the body of water to a second position in which a relatively small portion of said hull is submersed in the body of water, including first airfoil means extending transversely from said hull at a location above said surface for producing a lift force upon movement through the air and first propulsion means, said first airfoil means including an upper surface, a lower surface, and a trailing surface extending transversely to said upper and lower surfaces, said trailing surface being configured to define an arcuate recess having a forward portion and a pair of rearwardly extending side portions, said first propulsion means including blade means disposed adjacent to a trailing surface of said first airfoil means for applying forward directed air pressure thrust forces to said trailing surface of said first airfoil means and for inducing a flow of air along a path extending across an upper surface of said first airfoil means and downwardly toward the body of water at the trailing surface of said first airfoil means to induce the application of air pressure lift forces to said first airfoil means and movement of said hull from the first position toward the second position, said blade means including a plurality of generally radial blades having tip portions which are movable along an annular path which is at least partially disposed within said arcuate recess, said annular path having a forward portion which is disposed closely adjacent to said forward portion of said recess and is disposed above said lower surface and below said upper surface, said annular path having a pair of spaced apart side portions which are disposed closely adjacent to said rearwardly extending side portions of said recess, each of said side portions of said annular path being disposed above said lower surface of said first airfoil means and below said upper surface of said first airfoil means, each of said blades including surface means for inducing the application of forwardly directed air pressure thrust forces against said trailing surface at said forward portion of said recess, second airfoil means extending transversely from said hull at a location above said surface for producing a lift force upon movement through the air and second propulsion means for imparting forward thrust forces to said second airfoil means, said second airfoil means including an upper surface, a lower surface, and a trailing surface extending transversely to said upper and lower surfaces, said trailing surface of said second airfoil means being configured to define a second arcuate recess having a forward portion and a pair of rearwardly extending side portions, said propulsion means including second blade means disposed adjacent to a trailing surface of said second airfoil means for applying forward directed air pressure thrust forces to said trailing surface of said second airfoil means and for inducing a flow of air along a path extending across an upper surface of said second airfoil means and downwardly toward the body of water at the trailing surface of said second airfoil means to induce the application of air pressure lift forces to said second airfoil means and movement of said hull from the first position toward the second position, said second blade means including a plurality of generally radial blades having tip portions which are movable along a second annular path which is at least partially disposed within said second arcuate recess, said second annular path having a forward portion which is disposed closely adjacent to said forward portion of said second recess and is disposed above said lower surface and below said upper surface of said second airfoil means, said second annular path having a pair of spaced apart side portions which are disposed closely adjacent to said rearwardly extending side portions of said second recess, each of said side portions of said second annular path being disposed above said lower surface of said second airfoil means and below said upper surface of said second airfoil means, each of said blades of said second blade means including surface means for inducing the application of forwardly directed air pressure thrust forces against said trailing surface at said forward portion of said second recess, the blade means associated with each of said first and second airfoil means being rotatable in a plane which is canted at an angle relative to the direction of movement of said vessel and which intersects the trailing surface of its respective airfoil means, and the blade means associated with each of said first and second airfoil means also being rotatable about an axis which is canted at an angle relative to the forward direction of movement of said vessel.

* * * * *